United States Patent [19]

Lee

[11] Patent Number: 4,552,052
[45] Date of Patent: Nov. 12, 1985

[54] MODULATION RULE

[76] Inventor: Chung-Yang Lee, 4th Fl., No. 8, Chung-Yang Rd., Hsin-Tien, Taipei Hsien, Taiwan

[21] Appl. No.: 642,818

[22] Filed: Aug. 21, 1984

[51] Int. Cl.$^4$ .............................................. G09B 15/02
[52] U.S. Cl. .................... 84/473; 84/471 R; 84/471 SR; 84/474
[58] Field of Search .................. 84/470–474, 84/477–478, 482

[56] References Cited

U.S. PATENT DOCUMENTS 856,358  6/1907  Morris .................................... 84/478
3,752,031  8/1973  Mohos .............................. 84/471 R Primary Examiner—Lawrence R. Franklin
Attorney, Agent, or Firm—Cushman, Darby and Cushman

[57] ABSTRACT

A modulation rule having a member marked with a keyboard including white keys and black keys arranged in a similar manner to that of a keyboard musical instrument, and an indication table in which the names of keys are marked, for which the keys marked on each division, from left to right, are consecutively higher by one semitone; a movable member having divisions marked with numeral notes respectively, capable of being moved to have one division thereof aligned with a first division marked with a given key to provide the indication of scale at the given key; a plurality of indicating elements arranged in a certain relation with the keyboard and capable of being adjusted to provide visual indications concerning the keys, corresponding to the indicating elements which respectively should be lowered or raised by one semitone.

5 Claims, 9 Drawing Figures

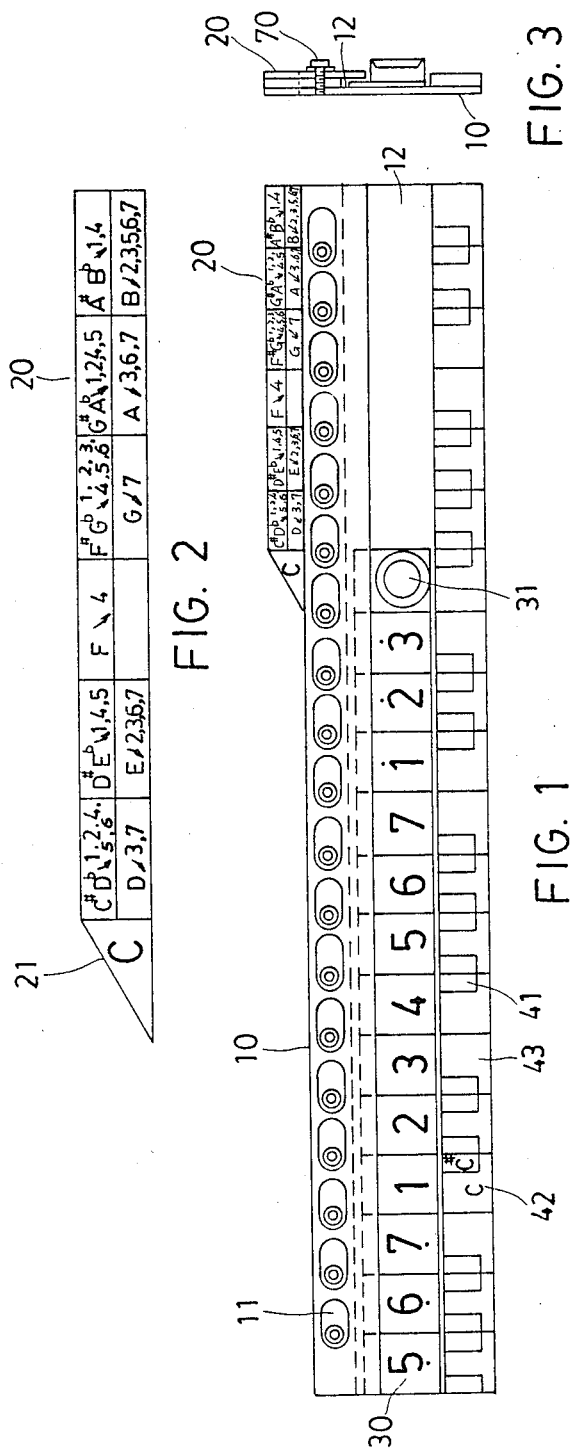

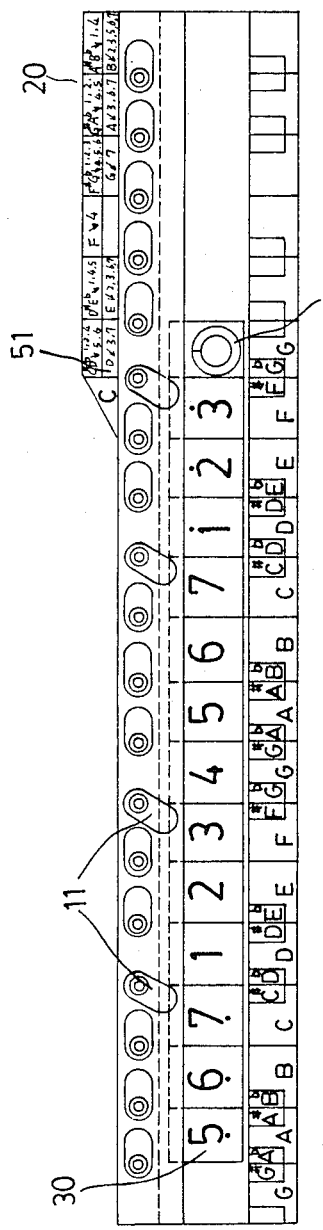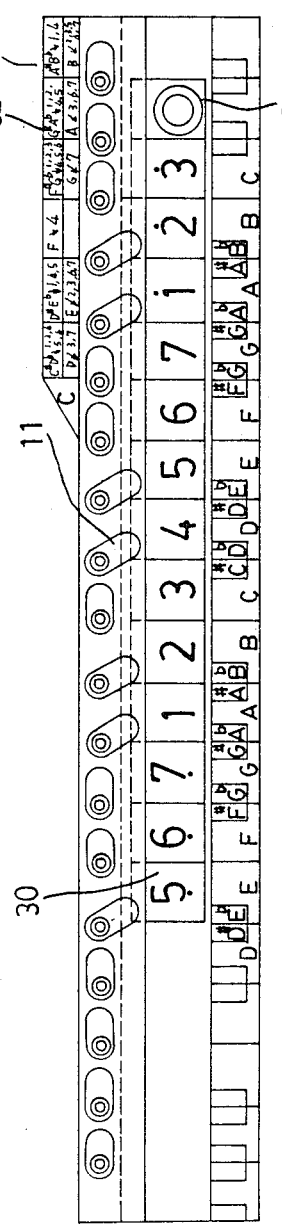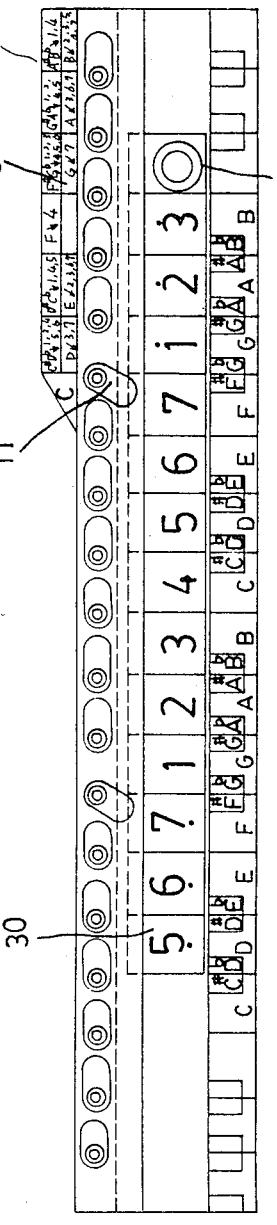

MODULATION RULE

FIELD OF THE INVENTION

This invention relates to a device capable of showing the scale on a given keynote. More particularly the present invention relates to a modulation rule which can give a clear indication of the positions of the keys on a keyboard so that an accurate tone can be produced on a given key.

BACKGROUND OF THE INVENTION

Most musical compositions normally consist of more than one key, so that, when playing the musical composition with a musical instrument, the modulation is usually difficult to the person who is not familiar with music or musical techniques.

In this regard, there are various tables and/or books which can provide a reference for scales on different keys. However the conventional published talks and/or books are inconvenient to carry about and are sometimes considered abstruse to the novice.

SUMMARY AND OBJECTS OF THE PRESENT INVENTION

A modulation rule is provided which is capable of indicating the scale of a given keynote. A modulation rule of the present invention comprises a first member including a first portion provided with first divisions, the first divisions are marked with a key or a pair of enharmonic keys and an indication of the notes that should be lowered or raised at the key or the pair of enharmonic keys. A second portion is located under the first portion and marked with a keyboard having whole-tone keys and semi-tone keys arranged in a similar manner to that of a keyboard for a musical instrument. The first division has a corresponding whole-tone key. A third portion is disposed between the first portion and the second portion. The third portion has a plurality of adjustable indicating elements provided thereon and positioned corresponding to the whole-tone keys of the keyboard. The indicating element is capable of being adjusted to give a visual indication whether the note of the corresponding whole-tone key thereof should be raised or lowered. A fourth portion has a second member movably mounted thereon. The second member is marked with second divisions in such a manner that they can align with the first divisions respectively. Each of the second divisions is marked with one numeral note of the diatonic scale so that when the second member is moved to a position where a certain division is aligned with a first division marked with the given key, and after adjusting indicating elements to give the visual indication, the scale and positions of notes according to the scale of the given key can be shown by the rule.

A general object of the present invention is to provide a modulation rule which can provide a rapid indication of the new scales when modulation is encountered in a composition.

Another object of the present invention is to provide a modulation rule which can indicate the note(s) which should be raised or lowered.

BRIEF DESCRIPTION OF THE DRAWINGS

The various objects and advantages of the present invention will become apparent upon a perusal of the following description of the preferred embodiment of the invention in conjunction with the drawings, in which:

FIG. 1 is a plan view of the modulation rule according to the preferred embodiment of this invention, with the rule adjusted to the C major scale;

FIG. 2 shows a portion of the modulation rule in an enlarged scale;

FIG. 3 is a side view of the modulation rule as shown in FIG. 1;

FIG. 4 is an illustration of the modulation rule of the embodiment shown in the preceding drawings at the position D major;

FIG. 5 is an illustration of the modulation rule of the same embodiment, shown at the position of G sharp or A flat;

FIG. 6 is a similar illustration of the modulation rule at the position of G major;

DETAILED DESCRIPTION OF THE PREFERRED EMBODIMENTS

Figure 7:
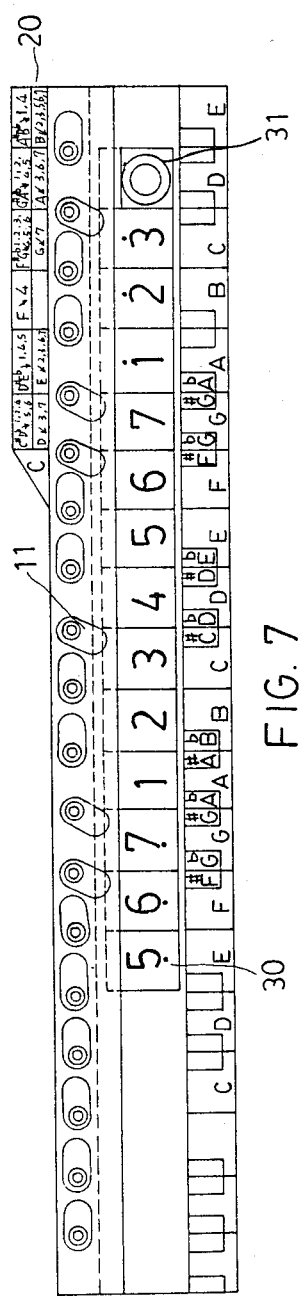
FIG. 7 is a similar illustration of the modulation rule at a position of A major.

According to the features of this invention, a modulation rule capable of indicating the scale on a given keynote comprises: a first member including a first portion provided with first divisions, the first divisions being marked with a key or a pair of enharmonic keys and an indication of the notes that should be lowered or raised at the key or the pair of enharmonic keys; a second portion located below the first portion, being marked with a keyboard having whole-tone keys and semi-tone keys similarly arranged in accordance with that of a keyboard musical instrument, each of first divisions having a corresponding white key; a third portion disposed between the first portion and the second portion, having a plurality of adjustable indicating elements provided thereon and positioned such that corresponding to the whole-tone keys of the keyboard, the indicating element being capable of being adjusted to give a visual indication of whether the note of the corresponding whole-tone key thereof should be raised or lowered; and a fourth portion; a second member movably mounted on the fourth portion and marked with second divisions in such a manner that they can align with the first divisions respectively, each of the second divisions being marked with one numeral note of the diatonic scale, so that, when the second member is moved to a position where a certain second division is aligned with a first division marked with the given key, and the indicating elements are adjusted to give the visual indication, the scale and positions of notes according to the scale of the given key can be shown in the rule.

According to another aspect of this invention, the keynote of the key or pair of keys are marked for the divisions, from left to right, consecutively lower by one semi-tone.

In a further aspect of this invention, each indicating element has a substantially elliptical shape and is pivotally mounted to the third portion on a point near one end of the major axis thereof. The indicating element can be turned about the point down to right or left.

According to yet another aspect of this invention, the keys having the same keynote and the key having the keynote lowered by one semi-tone are marked on a division.

The above disclosed modulation rule of the present invention is now further described in connection with the figures.

Referring now to FIG. 1, the first embodiment of the modulation rule is shown. In this embodiment the modulation rule of the present invention comprises a rectangular flat member 10 and a member 20. Member 20 is formed integrally with the upper portion of the rectangular member 10. The member 20 is divided into several first divisions and marked with the names of keys to form an indicating table. In the indicating table the inharmonic keys are C sharp, D flat; D sharp, E flat, F sharp, G flat; G sharp, A flat; A sharp, B flat and these are marked in the upper section of each first division respectively; the major key of F major is also marked in the upper section. The major keys of D major, E major, G major, A major, and B major and are marked on the lower section of the first divisions respectively; also, the left triangular portion 21 of member 20 is marked with a letter C representing the C major. The name of the key(s) is (are) accompanied with the numeral note(s) that should be lowered or raised. The drawings show that the keynote or the tonic of the key of each division, is, from left to right, consecutively higher by one half-tone; the division between the E major and G major is blank because the interval of the tonics of E major and G major is the major second.

The lower portion of the rectangular member 10 is marked with white keys 43 and black keys 41, which are arranged in a manner similar to the keyboard of a musical instrument. The white keys and black keys having a number encompassing more than two octaves are marked on the lower portion thereof, each key is marked with the name of the tone performed thereby, such as the "C" indicated by reference numeral 42.

A plurality of indicating elements 11 are pivotally mounted on the member 20 in a position under the indication table. Each indicating element 11 is rotatable about a pin 70. Pin 70 is located substantially aligned with the partition line of two adjacent white keys 43, so that, the indicating element 11 can be turned down to the right or the left. The former indicates that the corresponding note thereof should be lowered one half-tone, and the latter indicates that the corresponding note thereof should be raised one half-tone.

As can be seen in FIG. 3, a slip 12 is formed on the member 10, and a movable member 30 shorter in length than the member 10 is received therein. The movable member 30 is marked with numeral notes. Each numeral note is printed in a division, referred to as the second division, having are equal length with the white key 43. An adjusting knob 31 protrudes from the first division counted from the right end.

In FIG. 1 the rule is shown in a position of C major, where the knob 31 is moved to rest under the triangular portion 21 marked with "C".

Referring to FIGS. 4 to 8, the modulation rule is shown in the positions of other keys of the major scales. For instance in FIG. 4, when the indication of D major is required, the user should move the knob 31 until it lies under the division 51 marked with D, and the notation 3, 7. According to this notation, the user is to turn the two indicating elements 11 positioned above the second divisions marked with numeral notes 3, 7 of the movable member 30 down to left and directing toward the notes "7", "3", "7" indicating that the numeral note "7" or the "Si" in sol-fa of the D major should be raised one half-tone, and the numeral note "3" or the "Mi" in sol-fa should be raised by one half-tone.

Referring to FIG. 5, if the indication of G sharp or A flat is required, the user should move the knob 31 until it lies under the division 52 marked with G sharp, A flat notations 1, 2, 4, 5 in the upper section. According to this indication, the user is required to turn the four indicating elements 11 positioned respectively above the second divisions marked with numeral notes 1, 2, 4, 5 of the movable member 30 down to the right and directed towards the notes 1, 2, 4, 5 respectively, which means that the notes represented by numerals 1, 2, 4, 5 or the "Do", "Re", "Fa", "Sol" of the G sharp or A flat should be lowered by one half-tone. That is, for example the 5 (Sol) of G sharp should be performed as the D sharp of the C major if the key is accorded to A flat, and, if the A flat is accorded then the 5 (Sol) of G sharp then should be performed as the E flat of the C major.

Similarly, if the indication of G major is required, as shown in FIG. 6, the knob 31 should be moved until it lies under the division 53 marked with G and 7. According to the indication, the next step is to turn the indicating element 11 down to left, this means the 7 or "Si" of the G major should be raised one half-tone and performed as the F sharp of the C major.

FIG. 7 shows the indication of A major, the adjustment of the movable member 30 and the indicating elements 11 is effected in the abovedescribed manner. The notes 3, 6, 7 should be raised one half-tone and will be performed as the C sharp, F sharp, G sharp, of the C major.

Figure 8:
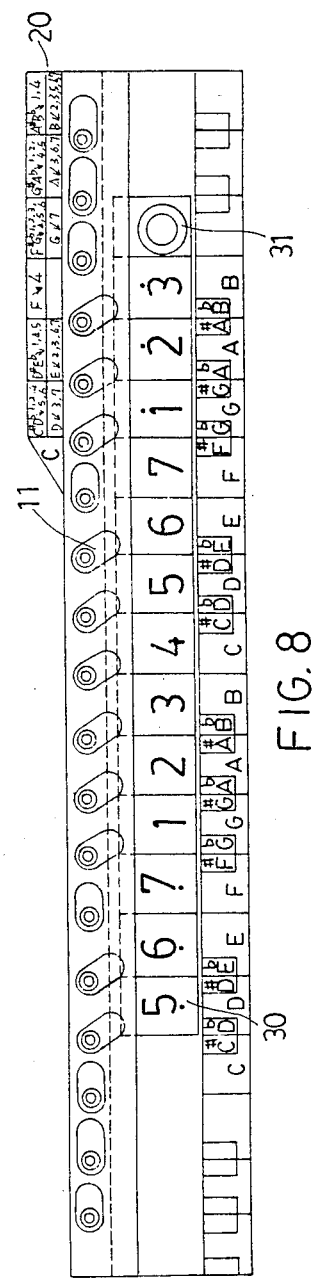
FIG. 8 is a similar illustration of the modulation rule at a position of G flat or F sharp.

FIG. 8 shows the indication of G flat or F sharp. After an adjustment similar to that performed as above-described, the user, even if not familiar with musicology or the principle of modulation, can find from the rule that the numeral notes 1, 2, 3, 4, 5, 6 should be performed as the G flat, A flat, B flat, B, D flat, and E flat of the C major if the key is accorded to the G flat. In the situation where F sharp is accorded, then the numeral notes 1, 2, 3, 4, 5, and 6 be performed as the F sharp, G sharp, A sharp, B, C sharp, and D sharp of the C major.

Figure 9:
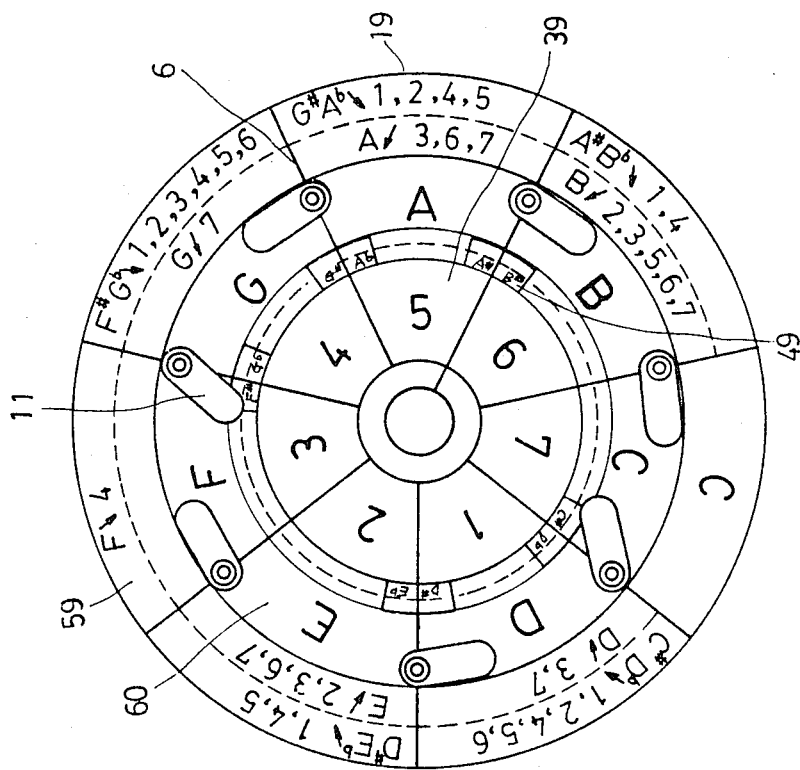
FIG. 9 is a schematic view of a second embodiment of this invention.

FIG. 9 shows a circular modulation rule according to this invention. This circular modulation rule includes a base disc 19 and a rotatable disc 39 concentrically mounted on the center thereof. The numeral notes 1 to 7 are marked on seven equalized divisions distributed around the rotatable disc 39. The keyboard is marked on a ring portion 49 around the periphery of the rotatable disc 39. The ring portion 49 includes an outer ring having the white keys marked thereon, and an inner ring on which the black keys marked at proper relative positions with respect to the white keys. There are two concentric ring portions 59 and 60 which are around the periphery of the base disc 19. Each concentric ring portion has equalized divisions. The divisions of the ring portion 59 are marked with the marks of keys C major; C sharp, D flat; D sharp, E flat; F major; F sharp, G flat; G sharp, A flat; A sharp, B flat respectively. The divisions of the ring portion 60 are marked with the key signatures "C", "D", "E", "G", "A", "B" together with an indication of the notes that should be lowered or raised.

The indicating elements 11 are disposed on the partition lines 61 of the equalized divisions and capable of being turned a proper angle thereby the non-pivoting end thereof can operate as the indicators of the black keys.

The use and adjustment of such a circular rule is substantially the same as the straight rule as above-described. In this embodiment (instead of moving the movable member 30), the user should turn the disc 39 to make the sector marked with numeral 1 aligned with the division 59 having the mark of the key signature that is required. For example refer to FIG. 9, when the indication of D major is required, the numeral 1 should be turned to lie under the division marked with D, according to the indication, thereafter, the indicating elements 11 should be turned to give a visual indication of the black keys that should be raised one semi-tone.

The indications of other keys can be obtained in a manner similar to that previously described herein.

While the invention has now been described in connection with what is presently considered to be the most practical and preferred embodiments, it is to be understood that the invention, is not to be limited to the disclosed embodiments, but on the contrary, is intended to cover various modifications and equivalent arrangements included within the spirit and scope of the appended claims which scope is to be accorded the broadest interpretation so as to encompass all such modifications and equivalent structures.

I claim:

1. A modulation rule capable of indicating the scale of a given keynote, which comprises:

a first member including a first portion provided with first divisions, said first divisions being marked with a key or a pair of enharmonic keys and an indication of the notes that should be lowered or raised at said key or pair of enharmonic keys;

a second portion located under said first portion, said second portion being marked with a keyboard having whole-tone keys and semitone keys arranged in a similar manner to that of a keyboard musical instrument;

each of said first division having a whole-tone key corresponding to each whole-tone key of said keyboard;

a third portion disposed between said first portion and said second portion, said third portion having a plurality of adjustable indicating elements provided thereon and positioned to correspond to said whole-tone keys of said keyboard, said indicating element being capable of being adjusted to provide a visual indication of whether the note of the corresponding whole-tone key thereto should be raised or lowered;

a fourth portion; and a second member movably mounted on said fourth portion and marked with second divisions, said second divisions align with said first divisions respectively, each of said second divisions being marked with one numeral note of the diatonic scale such that when said second member is moved to a position where a certain second division is aligned with a first division marked with the given key, and said indicating elements are adjusted to provide the visual indication, the scale and positions of notes according to the scale of the given key are shown by the rule.

2. A modulation rule according to claim 1, wherein the keynote of said key or pair of keys marked in said first divisions, from left to right, are consecutively higher by one semitone.

3. A modulation rule according to claim 1, wherein each said indicating element has a substantially elliptical shape and is pivotally mounted to said third portion on a point near one end of the major axis thereof such that said indicating element is rotatable about said point down to the right or left.

4. A modulation rule according to claim 1, wherein the keys having the same keynote or keynotes to be lowered by one semitone are marked in one of the first divisions.

5. A modulation rule according to claim 1, wherein tone names are respectively marked on the corresponding keys of said keyboard.

* * * * *